United States Patent [19]

Ito

[11] Patent Number: 5,309,554
[45] Date of Patent: May 3, 1994

[54] APPARATUS FOR CONVERTING CHARACTER OUTLINE DATA INTO DOT DATA, HAVING MEANS FOR MOVING OUTLINE SEGMENTS

[75] Inventor: Yosuke Ito, Nagoya, Japan

[73] Assignee: Brother Kogyo Kabushiki Kaisha, Nagoya, Japan

[21] Appl. No.: 755,529

[22] Filed: Sep. 5, 1991

[30] Foreign Application Priority Data

Sep. 12, 1990 [JP] Japan .................. 2-241863

[51] Int. Cl.$^5$ ............................ G06F 15/62
[52] U.S. Cl. .................. 395/150; 395/151; 395/142; 345/128; 345/144; 345/194
[58] Field of Search ........... 395/150, 151, 142, 143; 340/730, 731, 735, 750, 751; 345/144, 143, 128, 192, 194

[56] References Cited

U.S. PATENT DOCUMENTS

| | | | |
|---|---|---|---|
| 4,620,287 | 10/1986 | Yam | 364/518 |
| 4,675,830 | 6/1987 | Hawkins | 364/518 |
| 5,042,075 | 8/1991 | Sato | 382/47 |
| 5,099,435 | 3/1992 | Collins et al. | 395/150 |

FOREIGN PATENT DOCUMENTS

| | | |
|---|---|---|
| 0167838A2 | 1/1986 | European Pat. Off. . |
| 53-41017 | 10/1978 | Japan . |
| 2224913A | 5/1990 | United Kingdom . |
| 2232861A | 12/1990 | United Kingdom . |

*Primary Examiner*—Gary V. Harkcom
*Assistant Examiner*—Joseph Feild
*Attorney, Agent, or Firm*—Oliff & Berridge

[57] ABSTRACT

An apparatus having a dot data preparing device for converting original outline data representative of an outline of a character into dot data indicative of image dots to be formed at picture elements which lie within the character outline, when the character outline is superimposed on a coordinated pixel screen wherein the picture elements are defined by parallel x-axis pixel lines and parallel y-axis pixel lines perpendicular to the x-axis pixel lines. The apparatus includes a device for calculating a coordinate value of a maximal or minimal point of a segment of the character outline in an x-axis or y-axis direction, and an outline moving device for moving the outline such that the coordinate value of the maximal or minimal point has a predetermined positional relationship with the pixel lines. The dot data preparing device prepares the dot data, according to the outline data representative of the outline moved by the outline moving device.

17 Claims, 16 Drawing Sheets

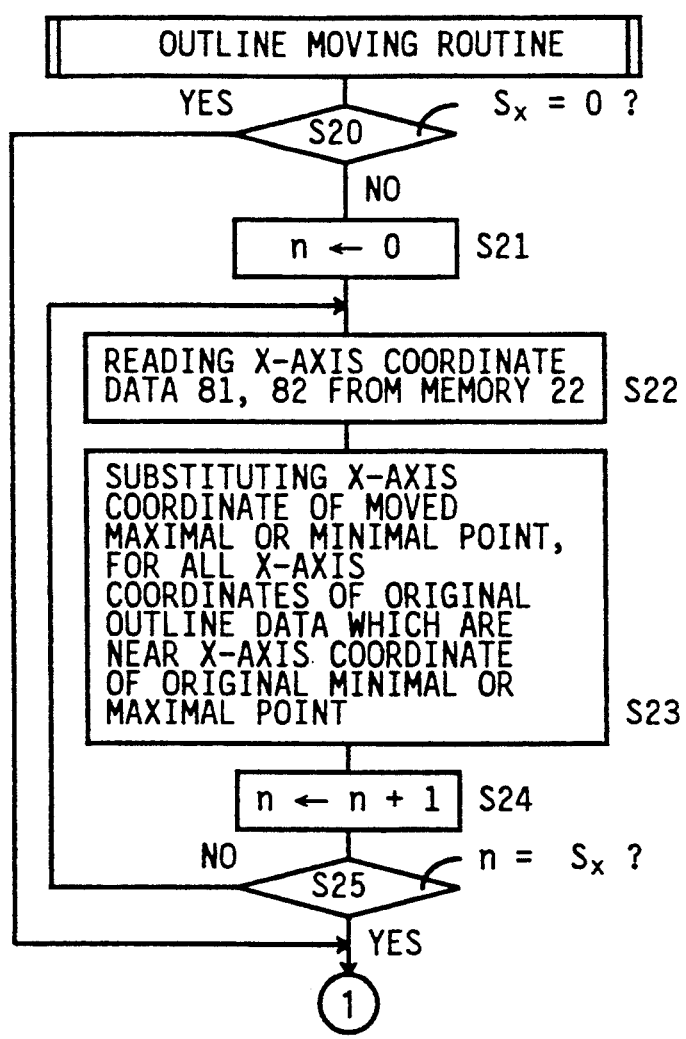

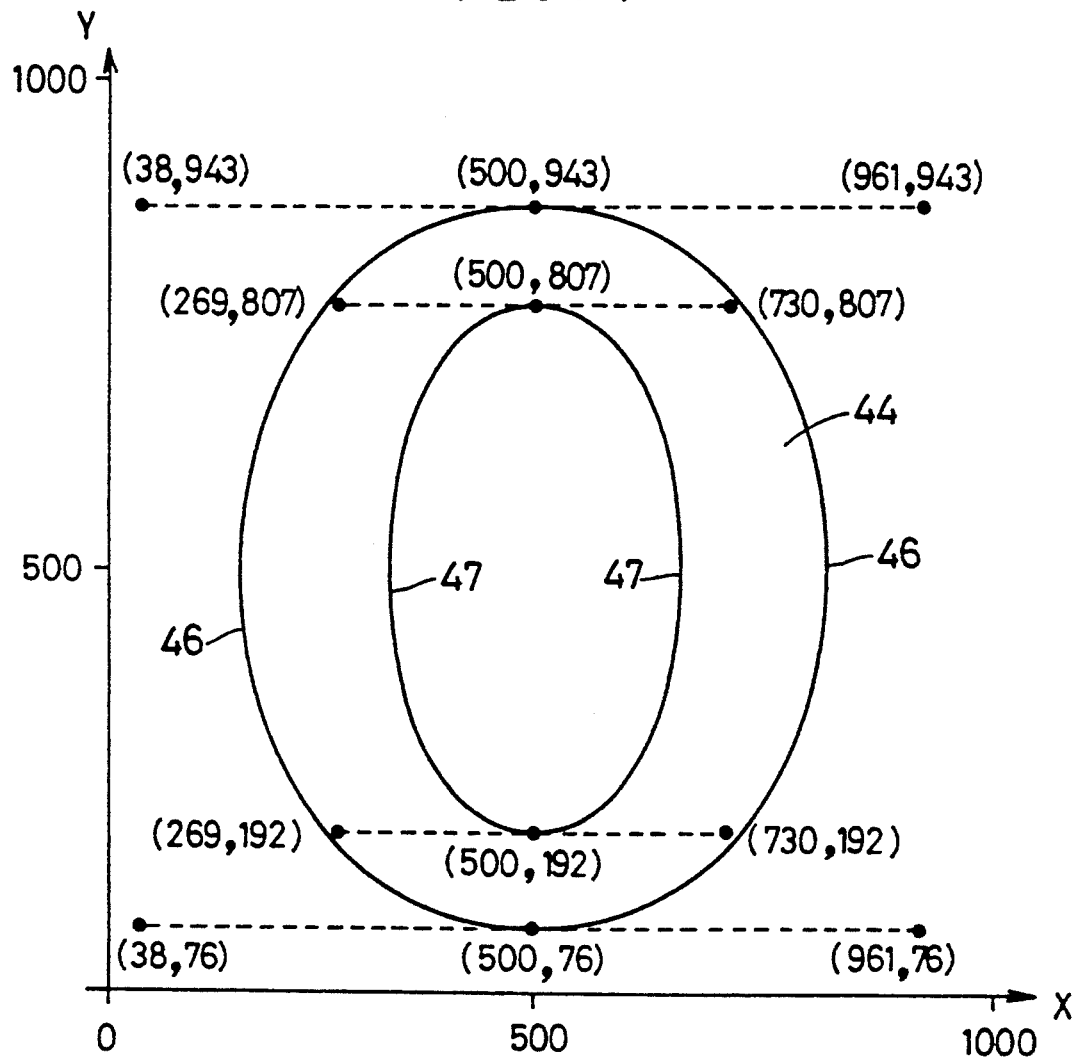

APPARATUS FOR CONVERTING CHARACTER OUTLINE DATA INTO DOT DATA, HAVING MEANS FOR MOVING OUTLINE SEGMENTS

BACKGROUND OF THE INVENTION

1. Field of the Invention

The present invention relates in general to an apparatus for converting outline data representative of the outline of characters such as letters and symbols and other visible representations, into dot data representative of image dots to be reproduced so as to collectively define the visible representations in a matrix of dots. More particularly, the invention is concerned with such a data converting apparatus capable of converting the outline data into dot data such that the outlines of the reproduced characters have smoothed curved portions.

2. Discussion of the Prior Art

Visible representations or characters such as letters, symbols and numerals represented by character data are printed, displayed or otherwise reproduced according to the character data suitably processed by a computer. In this field of data processing, it is widely practiced to use dot data indicative of whether an image dot is to be formed at each of picture elements which are the smallest part of a picture image and which determine the resolution of the reproduced image. If a batch of dot data representative of all the characters available for reproduction is prepared and stored in a character data memory, the memory should have an extremely large storage capacity. It is therefore desirable to store in the character memory a batch of outline data representative of the outlines of the characters, and convert the outline data into the corresponding dot data by suitable data converting means, when the characters are printed, displayed or otherwise outputted. An example of such data converting means is disclosed in Japanese Patent Publication No. 53-41017.

For converting the outline data into dot data as indicated above, the outline of each character represented by the outline data is superimposed on a coordinated pixel screen in which picture elements are defined by a plurality of pixel lines parallel to the X axis and a plurality of pixel lines parallel to the Y axis perpendicular to the X axis. The outline data is converted into dot data such that bits of the dot data are set to indicate the presence of image dots at the picture elements which are located within the outline of a character on the screen, so as to satisfy a predetermined condition. For instance, image dots are placed at the picture elements whose centers lie within the character outline.

The outline of each character consists of two or more straight or curved segments which represent one or more stroke of the character. However, the number and positions of image dots to be reproduced for a certain stroke of a character according to the dot data prepared by conversion from the outline data may undesirably vary, depending upon the positions of the outline segments defining the character stroke, relative to the pixel screen, i.e., depending upon the position at which the character in question is reproduced. This tendency is high especially for curved strokes of characters (curved segments of the character outlines).

FIG. 6 shows a letter "O" consisting of a stroke whose outline includes an outer loop 46 which consists of four curved segments. These curved segments have maximal and minimal points 11 as viewed in the x-axis and y-axis directions. As shown in the figure, image dots are formed at the picture elements corresponding to the maximal and minimal points 11, while image dots are not formed at the picture elements along the portions of the curved segments which are near the maximal and minimal points 11. This results in discontinuous or rugged external profile of the letter "O", giving an unpleasant appearance of the letter "O" as defined by the image dots formed according to the dot data prepared by conversion from the original outline data. The same phenomenon may occur for an inner loop 47 of the outline of the letter "O", which consists of four curved segments. For example, an image dot may not be formed at the picture element corresponding to each of the maximal and minimal points of the curved segments, while image dots are formed at the neighboring picture elements along the curved segments. The rugged profile of a character is perceived particularly where the width of the character stroke or strokes is relatively small, that is, where the number of the successive image dots which define the character stroke is relatively small. Even for a character having a relatively large stroke width, however, the local presence or absence of image dots at and near the maximal and minimal points of the curved segments of the stroke outline causes an unpleasant appearance of the reproduced character, as if the reproduced character was spotted by dust or dirt at its outline.

SUMMARY OF THE INVENTION

It is therefore an object of the present invention to provide a data converting apparatus capable of converting outline data of characters into dot data such that the outline of a character reproduced according to the dot data has smoothed curved portions.

The above object may be accomplished according to the principle of the present invention, which provides a data converting apparatus having dot data preparing means for converting a batch of original outline data representative of an outline of a character into a batch of dot data indicative of the presence of image dots to be formed at positions of picture elements which lie within the outline of the character so as to satisfy a predetermined condition, when the outline of the character is superimposed on a coordinated pixel screen wherein the picture elements are defined by a plurality of parallel x-axis pixel lines and a plurality of parallel y-axis pixel lines perpendicular to the x-axis pixel lines, the outline consisting of at least one segment, the apparatus including: (a) calculating means for calculating a coordinate value of a maximal or minimal point of the at least one segment of the outline of the character in an x-axis or y-axis direction; and (b) outline moving means responsive to the calculating means, for moving the outline such that the coordinate value of the maximal or minimal point has a predetermined positional relationship with the pixel lines. The dot data preparing means prepares the dot data, according to the outline data representative of the outline moved by the outline moving means.

In the data converting apparatus of the present invention constructed as described above, the outline of a character represented by the original outline data is moved by the outline moving means such that the coordinate value of a maximal or minimal point calculated by the calculating means has a predetermined positional relationship with the pixel screen, that is, with respect to the pixel lines. Since the number of the picture elements which lie within the outline of the character changes as the outline is moved, the positions of the image dots to be formed according to the dot data prepared by conversion from the outline data can be changed by moving the character outline, so that the character as reproduced according to the dot data has a smooth or continuous profile at and near the maximal and/or minimal points, without an image dot or dots projecting from the nominal character outline, or without an image dot or dots being absent so as to cause indented portions at or near the maximal and/or minimal points of the character outline.

Usually, the predetermined condition indicated above in connection with the picture elements at which image dots are to be formed requires the center of the picture elements to be located within the outline of the character. In this case, the outline moving means is adapted to change the original outline data so as to move the outline by a distance not exceeding a size of the picture elements, so that the predetermined positional relationship of the maximal or minimal point with the pixel lines is met. The size of the picture element is defined by a spacing of the pixel lines. Preferably, the predetermined positional relationship requires the coordinate value of the maximal or minimal point of the outline moved by the outline moving means to have a decimal fraction between 0.3 and 0.7, while the pixel lines define coordinate values represented by integers. If the decimal fraction is set at 0.5, for example, the coordinate values of 4.9 and 5.1 of the original maximal or minimal point are changed to 4.5 and 5.5, respectively, for example, to move the original character outline.

Where the outline of the character includes a Bezier curve, the outline moving means may be adapted to move the outline such that the maximal or minimal point of the Bezier curve is moved so as to meet the predetermined positional relationship with the pixel lines, and divide the Bezier curve into two curves such that the two curves are connected to each other at the maximal or minimal point which has been moved.

In one preferred arrangement of the invention, the outline moving means includes means for finding any points which define the character outline and which have a coordinate value whose difference from the coordinate value of the maximal or minimal point calculated by the calculating means falls within a predetermined range, for example, between 0 and 0.5, and the outline moving means is adapted to move the above points to the coordinate value to which the maximal and minimal point is moved so as to meet the predetermined positional relationship with the pixel lines.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which:

FIGS. 3A, 3B and 3C are flow charts illustrating a data converting operation performed according to control programs stored in a program ROM of the data converting apparatus;

FIG. 4 is a view showing an alphabetic letter "O" whose outline data is converted into dot data by the data converting apparatus;

DETAILED DESCRIPTION OF THE PREFERRED EMBODIMENT

Figure 1:
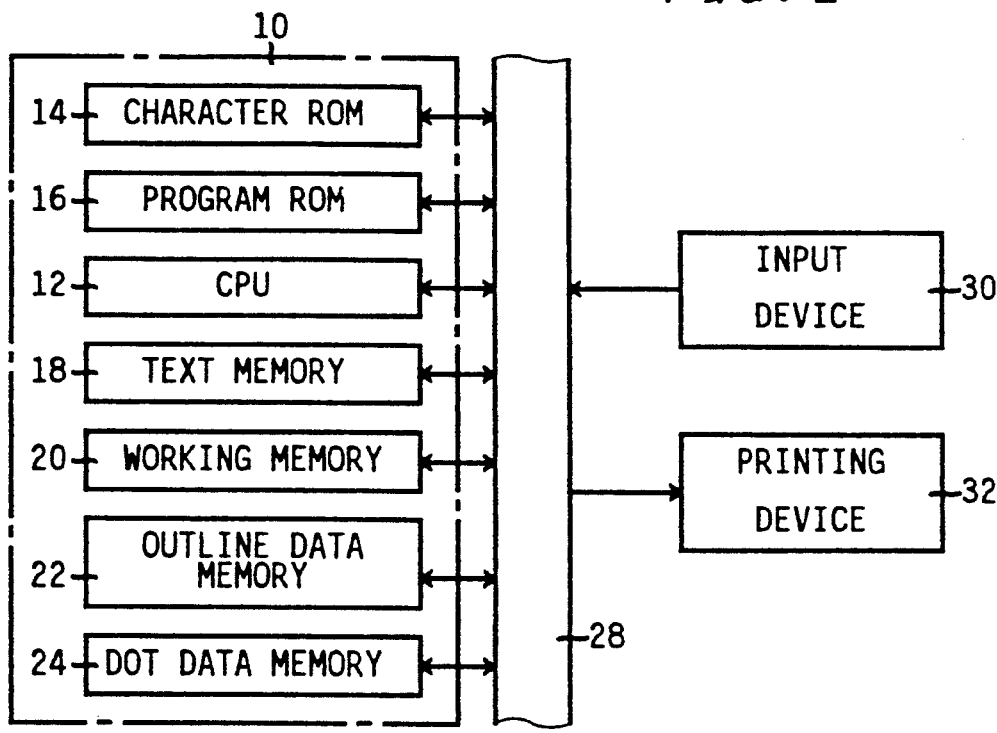
FIG. 1 is a schematic block diagram showing a control system of a laser printer, which incorporates one embodiment of a data converting apparatus of the present invention.

Referring first to FIG. 1 showing a part of a control system of a laser printer incorporating a data converting apparatus embodying the present invention, the control system is principally constituted by a microcomputer 10, which includes a CPU (central processing unit) 12, a CHARACTER ROM (read-only memory) 14, a PROGRAM ROM (read-only memory) 16, a TEXT memory 18, a WORKING memory 20, an OUTLINE DATA memory 22, and a DOT DATA memory 24. These elements of the microcomputer 10 are interconnected to each other through a data bus 28. To the bus 28, there are connected an input device 30 and a printing device 32. The input device 30 is provided to load the microcomputer 10 with data necessary for printing, while the printing device 32 is constructed to effect laser printing according to commands and signals from the microcomputer 10. The present laser printer has image resolving power of 300 dots per inch.

Figure 2:
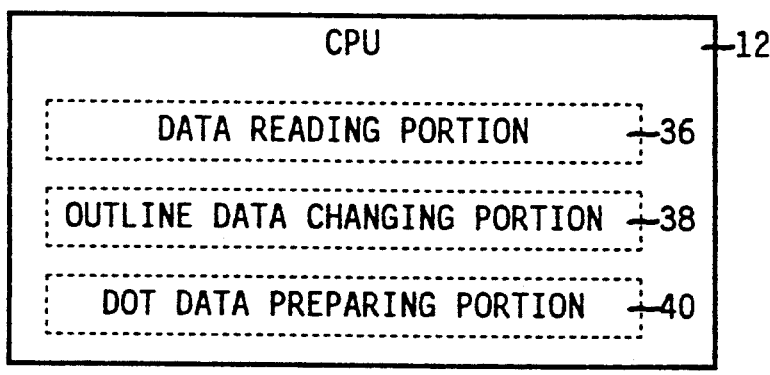
FIG. 2 is a schematic illustration of a central processing unit of the control system of the laser printer of FIG. 1.
Figure 5A:
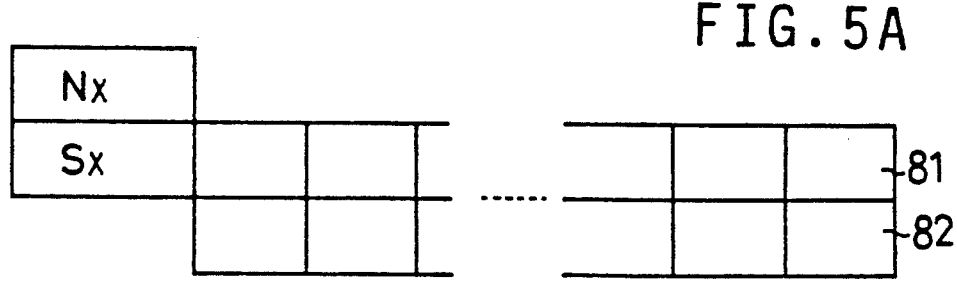
FIGS. 5A and 5B are views indicating original and changed outline data stored in an outline data memory of the control system.
Figure 5B:
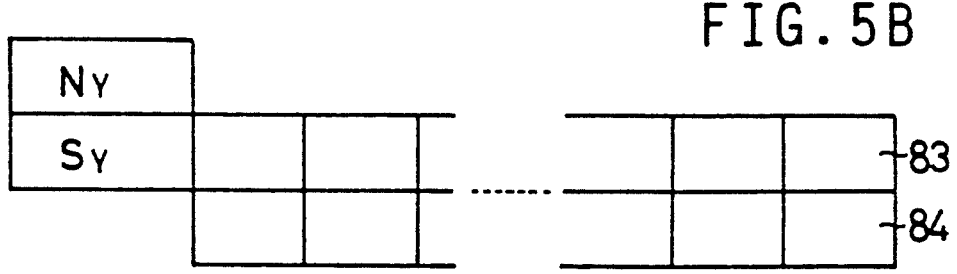

As schematically indicated in FIG. 2, the CPU 12 has a data reading portion 36 for reading outline data from the CHARACTER ROM 14, an outline data changing portion 38 for changing portions of the outline data which represent curved segments of the character outlines, and a dot data preparing portion 40 for converting the outline data into dot data. The TEXT memory 18 stores a batch of character data in the form of code data indicative of a text entered through the input device 30, and the WORKING memory 20 stores data necessary for the microcomputer 10 to execute various control programs stored in the PROGRAM memory 16. The OUTLINE DATA memory 22 is provided to store the original outline data, and data necessary to change the portions of the original outline data which represent curved segments of the characters. FIGS. 5A and 5B show the contents of the OUTLINE DATA memory 22. More specifically, the OUTLINE DATA memory 22 stores the number Nx of the maximal and minimal points of each curved segment in the x-axis direction of the outline of a character, the total number Sx of the maximal and minimal points in the x-axis direction of all the curved segments of the character outline, a plurality of sets of x-axis coordinate data 81 of the points defining the original curved segments, and a plurality of sets of x-axis coordinate data 82 for moving the original curved segments. The data sets 82 correspond to the data sets 81. The OUTLINE DATA memory 22 also stores the number Ny of the maximal and minimal points of each curved segment in the y-axis direction of the outline of the character, the total number Sy of the maximal and minimal points in the y-axis direction of all the curved segments of the character outline, a plurality of sets of y-axis coordinate data 83 of the points defining the original curved segments, and a plurality of sets of y-axis coordinate data 84 for moving the original curved segments. The data sets 84 correspond to the data sets 83. The DOT DATA memory 24 stores dot data prepared by the dot data preparing portion 40.

The CHARACTER ROM 14 stores multiple batches of outline data representative of the outlines of multiple characters such as alphabetic letters and symbols. The outline of each character consists of one or more stroke 44, as shown in FIG. 4 with respect to alphabetic letter "O" for illustrative purpose only. In this case, the outline of the stroke 44 consists of an outer loop 46 and an inner loop 47. The outline data representative of a character include coordinates of points which define individual segments of each stroke, and segment identifying data indicative of the kind of each segment (straight segment or curved segment). The character outline is defined in an X-Y coordinate system having 1000 Y-axis positions taken along the Y axis (vertical axis), and 1000 X-axis positions taken along the X axis (horizontal axis), as indicated in FIG. 4. For a straight stroke of a character as in letter "H", the x-axis and y-axis coordinate values of the points defining the straight segments representative of the straight stroke are stored in the CHARACTER ROM 14. For a curved stroke of a character as in letter "O", the coordinate values of points defining third-order curves called Bezier curves representative of the curved stroke are stored in the ROM 14. Each Bezier curve is defined by four points. In the case of letter "O" shown in FIG. 4, the outline of the single stroke 44 consists of a total of four Bezier curves, i.e., two Bezier curves for each of the outer and inner loops 46 and 47. Black dots in FIG. 4 indicate the points which define the Bezier curves (curved segments of the outline of the stroke 44). Dashed lines in the same figure indicate control arms, which will be described in detail. It will be understood that curved segments of the outlines of character strokes may be represented by other curves such as circular arcs, elliptical arcs, spline curves and B-spline curves. However, it is desirable to use curves that can be easily calculated for defining curved segments or portions of the character strokes. The CHARACTER ROM 14 stores sets of outline data of each character available, which represent the coordinates of the segments of each stroke outline, and the segment identifying data indicative of the kind of each segment (straight or curved segment). The segments of the character outline are stored one after another in one direction along the closed loop of the outline, together with the data which indicates whether the segments define the outer loop or inner loop.

Figure 12A:
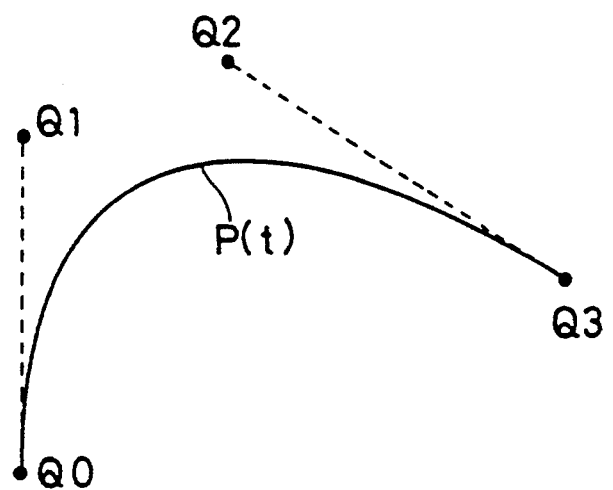
FIGS. 12A and 12B are views explaining a manner of defining a Bezier curve, and division of the Bezier curve.
Figure 12B:
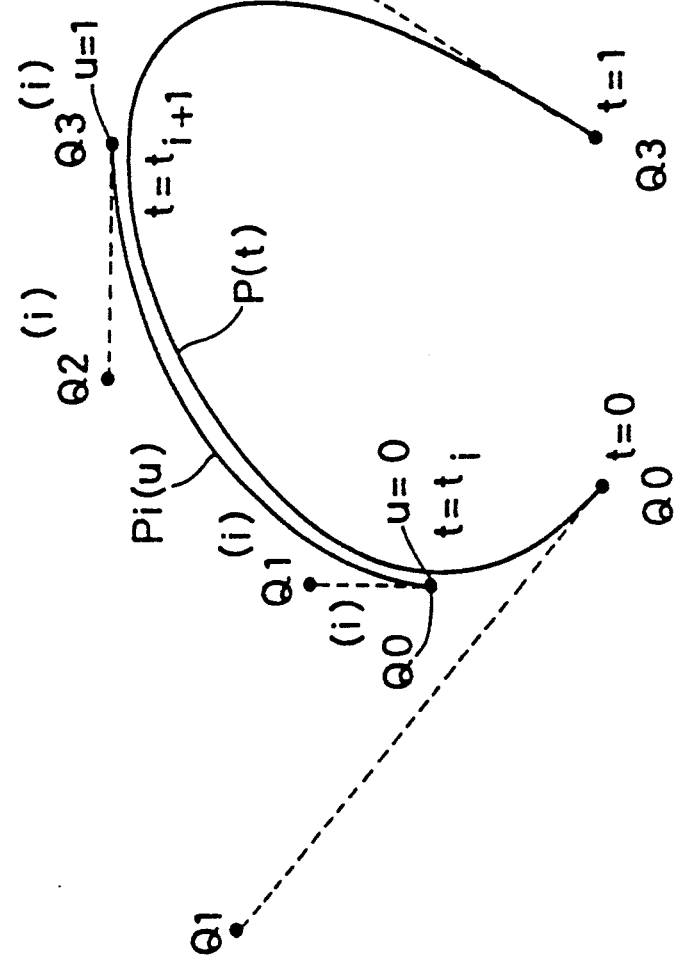

Referring to FIGS. 12A and 12B, there will be described the mathematical definition of a third-order Bezier curve, and the features of this curve. As indicated in FIG. 12A, a cubic Bezier curve P (hereinafter referred to simply as "curve") is defined by four points $Q_0$, $Q_1$, $Q_2$ and $Q_3$ on a two-dimensional plane. A given point P(t) on the curve (where $0 \leq t \leq 1$) is expressed by the following equation (1):

$$P(t) = [t^3 \ t^2 \ t \ 1] M_B \begin{bmatrix} Q_0 \\ Q_1 \\ Q_2 \\ Q_3 \end{bmatrix} \quad (1)$$

wherein $$M_B \begin{bmatrix} -1 & 3 & -3 & 1 \\ 3 & -6 & 3 & 0 \\ -3 & 3 & 0 & 0 \\ 1 & 0 & 0 & 0 \end{bmatrix}$$

Since $P(0)=Q_0$, and $P(1)=Q_3$, according to the above equation (1), the curve P has the point $Q_0$ as the start point, and the point $Q_3$ as the end point. The points $Q_1$ and $Q_2$ which do not lie on the curve P are called control points, since these points control the configuration of the curve P.

The following equation (2) for calculating maximal and minimal points of the curve P is obtained by differentiating the above equation (1) by a variable t:

$$P'(t)=(-3Q_0+9Q_1-9Q_2+3Q_3)t^2+(6Q_0-12Q_1+6Q_2)t+(-3Q_0+3Q_1) \quad (2)$$

A maximal or minimal point of the curve P is obtained where $0 \leq t \leq 1$, and $P'(t)=0$. The maximal and minimal points (Pt) of the curve P in the x-axis and y-axis directions are obtained by using the following equations for the value t in the above equation (2):

$(Ax, Ay)=A=-3Q_0+9Q_1-9Q_2+3Q_3$ $(Bx, By)=B=6Q_0-12Q_1+6Q_2$ $(Cx, Cy)=C=-3Q_0+3Q_1$

The following equation (3) is used as a discriminant for the maximal and minimal points in the x-axis direction:

$$Dx=Bx^2-4AxCx \quad (3)$$

It will be understood that no maximal or minimal points in the x-axis direction exists, at least where $Dx<0$, or where $Ax=0$. Where $Dx \leq 0$, the following equations (4) are established:

$tx_1=(-Bx+SQRT(Dx))/(2Ax)$ $tx_2=(-Bx-SQRT(Dx))/(2Ax) \quad (4)$

Therefore, it will be understood that the curve P does not have maximal or minimal points, where the range of two points $tx_1$ and $tx_2$ do not fall within the range of $0 \leq t \leq 1$. In the equation (4), SQRT designates a square root.

As a discriminant for the maximal and minimal points in the y-axis direction, the following equation (5) is used:

$$Dy = By^2 - 4AyCy \qquad (5)$$

It will be understood that no maximal or minimal points in the y-axis direction exists, at least where $Dy<0$, or where $Ay=0$. Where $Dy \geq 0$, the following equations (6) are established:

$$ty_1 = (-By + SQRT(Dy))/(2Ay)$$

$$ty_2 = (-By - SQRT(Dy))/(2Ay) \qquad (6)$$

Therefore, it will be understood that the curve P does not have maximal or minimal points, where the range of two points $ty_1$ and $ty_2$ do not fall within the range of $0 \leq t \leq 1$.

Since $P'(0) = 3(Q_1 - Q_0)$ and $P'(1) = 3(Q_3 - Q_2)$, the angle of inclination of segment $Q_0 - Q_1$ is equal to that of the curve P at point $Q_0$. Accordingly, the configuration of the curve P can be approximated by the angles of inclination of segments $Q_0 - Q_1$ and $Q_3 - Q_2$. In this respect, these segments are called the control arm of the curve P.

Referring to FIG. 12B, there will be described a manner of dividing the curve P into a plurality of divided curves P, for moving the maximal or minimal point of the original curve P. In the figure, a curve Pi between points ti and ti+1 is represented by four points $Q_0$, $Q_1$, $Q_2$ and $Q_3$ which define the curve P, where $ti < ti+1$, and $ti \neq ti+1$. Four points $Q_0^{(i)}$, $Q_1^{(i)}$, $Q_2^{(i)}$ and $Q_3^{(i)}$ define a curve $Pi(u)$, where $0 \leq u \leq 1$. It will be understood from the equation (1) that $Q_0^{(i)} = P(ti)$, and $Q_3^{(i)} = P(ti+1)$. By substituting "t" in the above equation (1) according to the equation $u = (t-ti)/(ti+1-ti)$ for parameter conversion, $Pi(u)$ is obtained as follows:

$$Pi(u) = [\{(ti+1\ ti)u + ti\}^3\ \{(ti+1\ ti)u + ti\}^2\ (ti+1\ ti)u + ti\ 1] \times$$

$$M_B \begin{bmatrix} Q_0 \\ Q_1 \\ Q_2 \\ Q_3 \end{bmatrix} = [u^3\ u^2\ u\ 1] \times$$

$$\begin{bmatrix} (ti+1 - ti)^3 & 0 & 0 & 0 \\ 3(ti+1\ ti)^2 ti & (ti+1 - ti)^2 & 0 & 0 \\ 3(ti+1\ ti)ti^2 & 2(ti+1 - ti)ti & ti+1 - ti & 0 \\ ti^3 & ti^2 & ti & 1 \end{bmatrix} \times$$

$$M_B \begin{bmatrix} Q_0 \\ Q_1 \\ Q_2 \\ Q_3 \end{bmatrix} = [u^3\ u^2\ u\ 1]M_B \times \begin{bmatrix} t_{11} & t_{12} & t_{13} & t_{14} \\ t_{21} & t_{22} & t_{23} & t_{24} \\ t_{31} & t_{32} & t_{23} & t_{34} \\ t_{41} & t_{42} & t_{43} & t_{44} \end{bmatrix} \begin{bmatrix} Q_0 \\ Q_1 \\ Q_2 \\ Q_3 \end{bmatrix} =$$

$$[u^3\ u^2\ u\ 1]M_B \times \begin{bmatrix} Q_0^{(i)} \\ Q_1^{(i)} \\ Q_2^{(i)} \\ Q_3^{(i)} \end{bmatrix}$$

where,
$t_{11} = (1-ti)^3$
$t_{12} = (1-t)^2 ti$
$t_{13} = (1-ti)ti^2$
$t_{14} = ti^3$
$t_{21} = (1-ti)^2(1-ti+1)$
$t_{22} = (1-ti)\{ti+1-(3ti+1-2)ti\}$
$t_{23} = ti\{2ti+1-(3ti+1-1)ti\}$
$t_{24} = ti^2 ti+1$
$t_{31} = (1-ti)(1-ti+1)^2$
$t_{32} = (1-ti+1)\{2ti+1-(3ti+1-1)ti\}$
$t_{33} = ti+1\{ti+1-(3ti+1-2)ti\}$
$t_{34} = titi+1^2$
$t_{41} = (1-ti+1)^3$
$t_{42} = (1-ti+1)^2 ti+1$
$t_{43} = (1-ti+1)ti+1^2$
$t_{44} = ti+1^3$ Therefore, the following equations (7) are obtained:

$$Q_1^{(i)} = t_{21}Q_0 + t_{22}Q_1 + t_{23}Q_2 + t_{24}Q_3$$

$$Q_2^{(i)} = t_{31}Q_0 + t_{32}Q_1 + t_{33}Q_2 + t_{34}Q_3 \qquad (7)$$

Thus, the control points $Q_1^{(i)}$ and $Q_2^{(i)}$ of the curve Pi can be obtained. In the manner described above, the coordinate values of the maximal and minimal points of a Bezier curve can be calculated, and the curve is divided at each maximal or minimal point into two curved segments (Bezier curves). The above equations (3) through (7) are used to calculate the value t, and the calculated values t are ordered from the smallest to the largest, as $ti (i=1$ through $j-1)$. Where no maximal or minimal points are found on a Bezier curve, the curve is not divided. The value j is equal to (total number of the maximal and minimal points plus 1), and $t_0 = 0$, and $tj = 1$.

Figure 6:
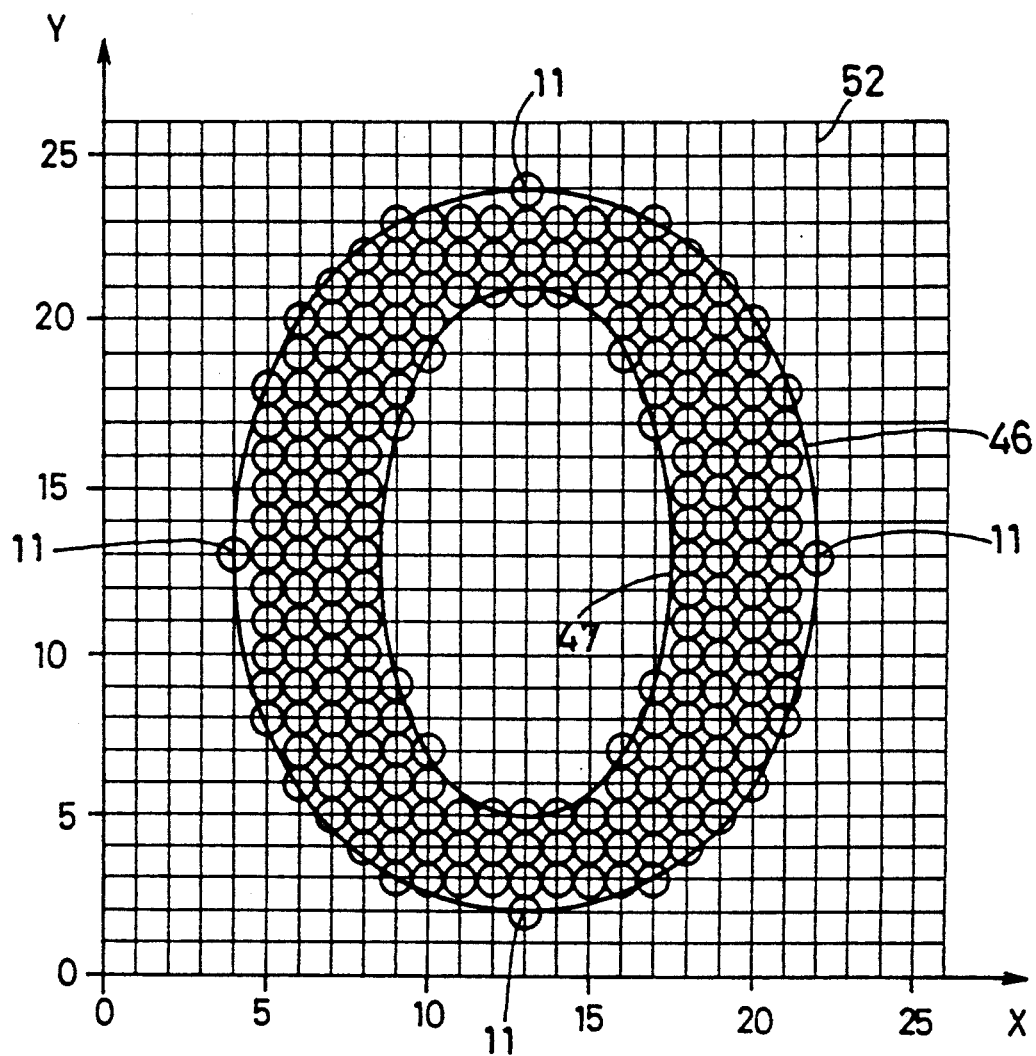
FIG. 6 is a view illustrating the letter "O" as superimposed on a coordinated pixel screen.

The conversion of outline data into dot data according to the data converting apparatus of the present laser printer is effected by using a two-dimensional coordinated pixel screen 52 as shown in FIG. 6, on which the outline 46 of a character as represented by outline data is superimposed for preparing the dot data by conversion from the outline data. The pixel screen 52 consists of a multiplicity of picture elements, which are the smallest parts of a printed picture image available on the laser printer. The picture elements are defined by equally spaced-apart x-axis and y-axis pixel lines which are perpendicular to each other. In the present embodiment, each picture element has a circular form whose center lies on an intersection of the appropriate x-axis and y-axis pixel lines. The position of the picture element is represented by the x-axis and y-axis coordinate values of these two pixel lines. The picture elements may take other forms such as a rectangle. Dot data is prepared based on the outline data such that data bits are set to indicate whether or not an image dot is to be formed at each of the picture elements or not.

The coordinated pixel screen 52 corresponds to a printing area on a recording medium within which laser printing is effected according to the prepared dot data. In the interest of brevity and simplification, FIG. 6 shows a portion of the coordinated pixel screen 52, which corresponds to one character of a text to be printed on the recording medium. The x-axis and y-axis pixel lines are numbered over the entire area of the screen 52. It will be understood that the picture elements corresponding to the other characters (not shown in FIG. 6) of the text are represented by the x-axis and y-axis pixel lines which are appropriately numbered. The numbers identifying these pixel lines are larger than those for the character indicated in FIG. 6, namely, letter "O".

The conversion of the outline data into the corresponding dot data is effected with the outline of the character superimposed on the coordinated pixel screen 52, so that an image dot is formed at each picture element of the screen 52 which lies within the area defined by the outline of the character. This area is hereinafter simply called "outline of the character". The logical value of the dot data bit corresponding to the picture element at which an image dot is to be formed is set to "1". Each picture element lies entirely or partially within the outline, or is entirely outside the outline In the present embodiment, dot data bits are set to "1" for those picture elements whose center lies within the outline.

The present laser printer is adapted to print characters in a selected one of different sizes, namely, 6.48 point, 10 point, 12 point, 20 point, 24 point and 30 point, for example. According to the selected character size, the coordinates of the points defining the outline of the character in the 1000×1000 coordinate system of FIG. 4 are converted into the corresponding coordinate values on the coordinated pixel screen 52 of FIG. 6 in which each picture element is dimensioned as "1" in the x-axis and y-axis directions. If a character of a selected point size is formed by a C×C matrix of picture elements (dots), the coordinate values of a point on the pixel screen 52 are obtained by multiplying the coordinate values of the corresponding point on the character outline in the 1000×1000 coordinate system, by C/1000. In this example, the selected character size is 6.48 point, and each character is formed by a 27×27 matrix of picture elements or dots. The numbers 0 through 25 given on the pixel screen 52 in FIG. 6 to identify the x-axis and y-axis pixel lines represent the coordinate values on the screen 52 in the present example. To superimpose the outline of each character on the pixel screen 52, the coordinate values of the reference point of the character on the screen 52 are determined, based on the printing position data. According to the determined coordinates of the reference point as well as the calculated coordinates of the character outline, the character outline is positioned on the pixel screen 52 of FIG. 6.

Figure 7A:
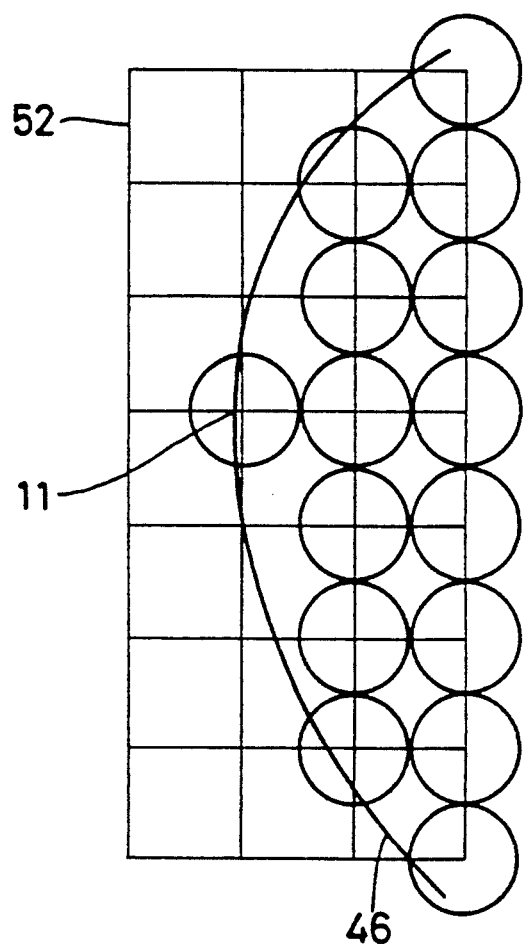
FIGS. 7A and 7B are views explaining different image dot arrangements depending upon the relative position of the outline of a character relative to the printing position of the character.
Figure 7B:
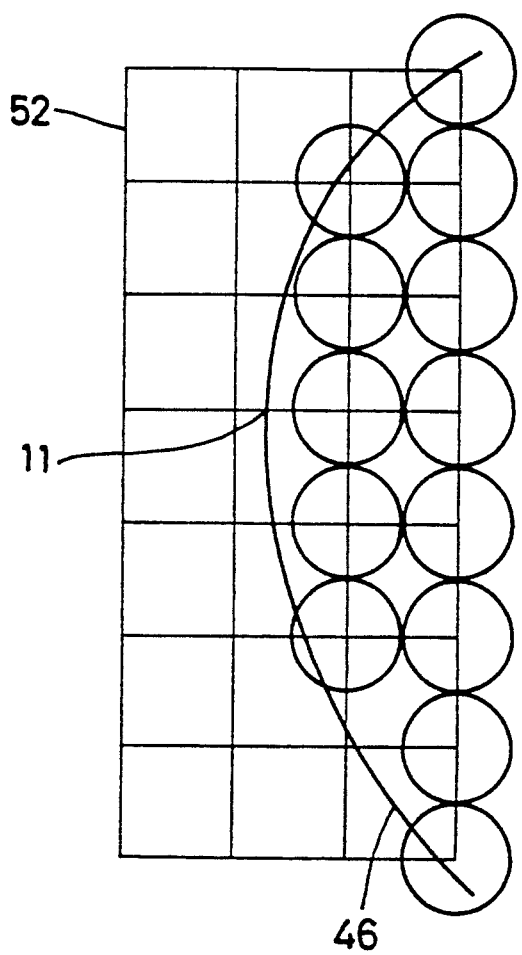

The position of the outline of a character on the pixel screen 52 is influenced by the selected size and printing position of the character, as indicated above. Consequently, the number of the picture elements which lie within the width of the stroke 44 (FIG. 4) in the x-axis or y-axis direction may vary depending upon the selected character size and the relative position between the character outline (outline of the stroke 44) and the pixel screen 52. This causes a discontinuous or rugged profile of the stroke 44 as reproduced by image dots formed according to the dot data prepared by conversion from the outline data. This tendency is high particular at and near the maximal and minimal points 11 (FIG. 6) in the x-axis and y-axis directions of the curved segments of the stroke outline. For example, the number of picture elements (image dots) whose centers are inside the outer loop 46 of the outline of the stroke 44 and lie on the y-axis pixel line (vertical column) nearest to the minimal point 11 of the curved segment of the stroke outline may vary as indicated in FIGS. 7A and 7B, which show a part of the pixel screen 52. More specifically, a vertical column of five image dots is formed on the pixel line nearest to the minimal point 11 as shown in FIG. 7B, giving a smoothed profile to the stroke, while only one image dot is formed on the pixel line nearest to the minimal point 11, as shown in FIG. 7A, causing discontinuity of the outer profile of the stroke.

In the present laser printer having the data converting apparatus constructed according to the principle of the present invention, the portions of the outline data which represent curved segments of the outline of a character stroke are changed or modified, if necessary, before the outline data is converted into dot data, where the selected character size is larger than 2-point size, so that the character stroke can be printed in the matrix of dots, always with a smoothed or continuous profile even at and near the maximal and minimal points of the curved segments of the stroke outline. To this end, the control programs stored in the PROGRAM ROM 16 for controlling a laser printing operation include a data converting routine of FIG. 3A, which comprises an outline moving routine of FIGS. 3B and 3C. Referring to the flow charts of FIGS. 3A, 3B and 3C, the data converting routine will be described with respect to the outline of alphabetic letter "O". However, no detailed description on the manner of printing according to the dot data will be provided, since it is not necessary to the understanding of the principle of the present invention. Briefly, a text stored in the TEXT memory 18 is printed one page after another. Each time a page is printed, character data corresponding to that page of the text is retrieved from the TEXT memory 18, and the corresponding batch of outline data is retrieved from the CHARACTER ROM 14 and is converted into the corresponding batch of dot data.

Initially, step S1 is executed to activate the data reading portion 36 for reading out the outline data of the letter "O", and the data indicative of the selected character size. In this step S1, the outline data is changed to the selected character size. For instance, where the selected character size is 6.48 point, the coordinate values of the original outline data are multiplied by 0.027. The control flow then goes to step S2 to determine whether the selected character size is larger than 2-point size, or not. A negative decision (NO) is obtained in step S2, if the selected character size is 2-point or smaller. In this case, step S2 is followed by step S3 in which the data representative of any curved segments of the character outline is converted into straight segment data which represent a relatively large number of straight segments which approximate the curved segments. Then, step S4 is implemented to activate the dot data preparing portion 40 for preparing dot data based on the outline data such that the bits of the dot data are set to indicate the presence of image dots at the picture elements whose centers lie within the outline of the character as superimposed on the pixel screen 52. The prepared dot data is stored in the DOT DATA memory 24.

If the selected character size is larger than 2-point size, for example, 20 point, 24 point or 30 point, an affirmative decision is obtained in step S2, and the control flow goes to step S5 to read out the coordinates of a point which contributes to defining the segments of the character outline, and segment identification data indicative of the kind of the segment (curved or straight segment) defined by the point under consideration. Step S5 is followed by step S6, in which a segment identifier determines whether the segment under consideration is a curved segment or not. If the relevant segment is a straight segment, a negative decision (NO) is obtained in step S6, and step S12 is implemented to store the relevant straight segment data into the OUTLINE DATA memory 22. If the relevant segment is a curved segment, an affirmative decision (YES) is obtained in step S6, and the control flow goes to step S7 in which the maximal and minimal points in the x-axis direction of the relevant curved segment are obtained by calculating $tx_1$, $tx_2$ according to the above equations (3) and (4), while the maximal and minimal points in the y-axis direction are obtained by calculating $ty_1$, $ty_2$ according to the above equations (5) and (6). The number of the x-axis maximal and minimal points is stored as Nx in the OUTLINE DATA memory 22, as indicated in FIG. 5A, while the number of the y-axis maximal and minimal points is stored as Ny in the memory 22, as indicated in FIG. 5B. Further, the numbers Nx and Ny are added to the total numbers Sx and Sy, respectively, to update these total numbers as the points defining the outline segments are read.

The control flow then goes to step S8 to determine, based on the numbers Nx, Ny, whether there is any maximal or minimal point, namely, whether Nx=0 and Ny=0. If Nx=0 and Ny=0, a negative decision (NO) is obtained in step S8, and the control flow goes to step S11, skipping steps S9 and S10. In this case, the curved segment data of the relevant curved segment is stored in the memory 22, without any change. If any maximal or minimal point is found in step S8, step S9 is executed to order the values of the variable tx, ty calculated in step S7, from the smallest to the largest, and temporarily store these values tx, ty in the WORKING memory 20. Then, in the same step S9, the x-axis coordinates of the maximal and minimal points in the x-axis direction are calculated by using the variable tx in the above equation (1), and the calculated x-axis coordinates are stored in the memory 22, as indicated at 81 in FIG. 5A. Similarly, the y-axis coordinates of the maximal and minimal points in the y-axis direction are calculated by using the variable ty in the equation (1), and the calculated y-axis coordinates are stored in the memory 22, as indicated at 83 in FIG. 5B. These coordinate values are those of the original outline data, and are used in steps S23 and S33 in the outline moving routine of FIGS. 3B and 3C, to identify the points of the curved segments which are to be moved. Subsequently, the data for moving the relevant curved segment is obtained based on the original curved segment data, and depending upon whether the relevant curved segment is part of an outer loop (46) or inner loop (47) of the stroke outline, and whether the point under consideration is a maximal point or minimal point of the relevant curved segment. In the present embodiment, the outline data include data indicative of the outer or inner loop to which the relevant segment belongs. This data is read in step S1. The maximal and minimal points can be discriminated from each other, based on the signs of the differentiated values of the coordinates of points near the maximal or minimal points.

Figure 8A:
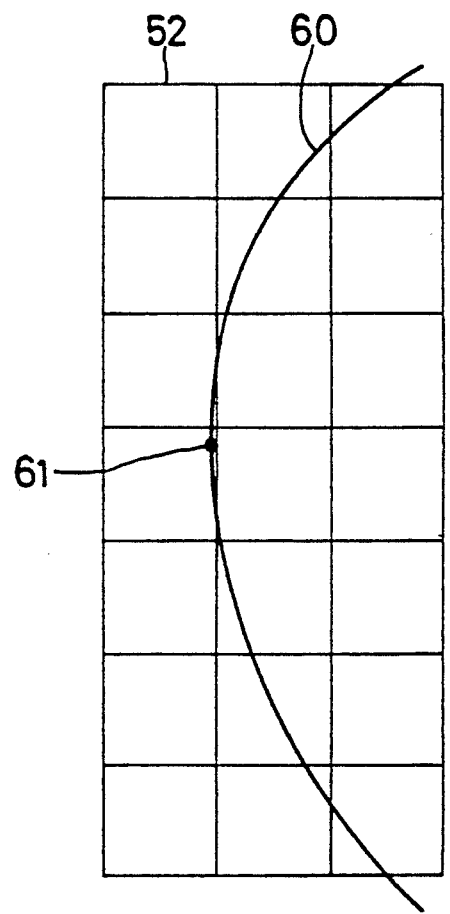
FIGS. 8A and 8B are views explaining a movement of a curved outline segment of a character in the x-axis direction.

The manner of obtaining the data for moving the curved segment in the x-axis direction will be described by reference to FIGS. 8A and 8B, which show a curved segment 60 as superimposed on the pixel screen 52, by way of example. In FIG. 8A, a minimal point of the curved segment 60 is indicated at 61. If the image dots which collectively define a desired image are to be formed to the left of the segment 60, an image dot is not formed at the picture element nearest to the minimal point 61, causing the reproduced image to have an indented portion near the point 61. On the other hand, if the image dots are to be formed to the right of the segment 60, an image dot is formed at the picture element nearest to the minimal point 61, causing the reproduced image to have a projecting portion near the point 61. In either case, the reproduced image suffers from an unpleasant appearance due to the indented or projecting portion. To avoid this undesired phenomenon, the minimal point 61 of the curved segment 60 is detected based on the equation representative of the segment 60 and the above equations (3) and (4), and the x-axis coordinate of the minimal point 61 is calculated by using in the above equation (1) the variable t representative of the point 61. If the calculated x-axis coordinate of the minimal point 61 has a decimal fraction, this x-axis coordinate value is changed to a value which is a sum of a predetermined fractional value of 0.5 and the largest integer not exceeding the original coordinate value. For instance, the original x-axis coordinate values of 5.1 and 4.9 (having respective integer portions of 5 and 4 and respective decimal portions of 0.1 and 0.9) are changed to new coordinate values of 5.5 and 4.5, respectively. However, the predetermined fractional value may be a value other than 0.5, preferably selected within a range between 0.3 and 0.7.

Figure 8B:
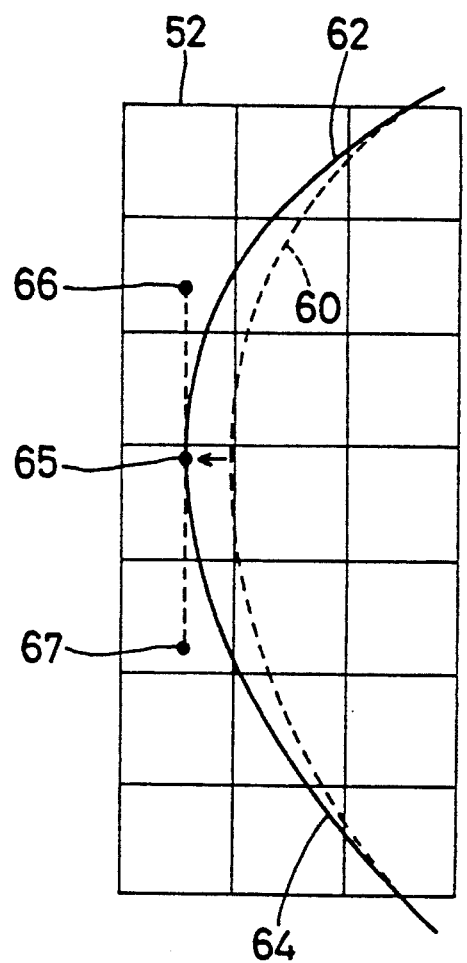

Accordingly, the x-axis coordinate of the minimal point 61 of the curved segment 60 is changed to the x-axis coordinate value as indicated at point 65 in FIG. 8B, while the coordinates of the opposite ends of the segment 60 are kept unchanged from those represented by the original outline data. In step S9, the x-axis coordinate value of this point 65 is stored in the memory 22, as the data 82, such that the data 82 corresponds to the data 81, namely, such that the x-axis coordinate value of the new minimal point 65 corresponds to that of the original minimal point 61.

Figure 9A:
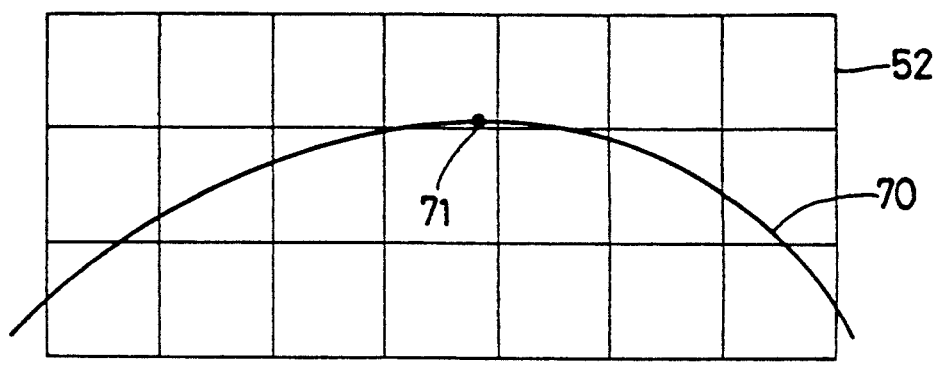
FIGS. 9A and 9B are views explaining a movement of a curved outline segment of a character in the y-axis direction.

The manner of obtaining the data for moving the curved segment in the y-axis direction will be described by reference to FIGS. 9A and 9B, which show a curved segment 70 as superimposed on the pixel screen 52, by way of example. In FIG. 9A, a maximal point of the curved segment 70 is indicated at 71. If the image dots are to be formed above the segment 70, an image dot is not formed at the picture element nearest to the maximal point 71, causing the reproduced image to have an indented portion near the point 71. On the other hand, if the image dots are to be formed below the segment 70, an image dot is formed at the picture element nearest to the maximal point 71, causing the reproduced image to have a projecting portion near the point 71. In either case, the reproduced image suffers from an unpleasant appearance due to the indented or projecting portion. To avoid this undesired phenomenon, the maximal point 71 of the curved segment 70 is found based on the equation representing the segment 70 and the above equations (5) and (6), and the y-axis coordinate of the maximal point 71 is calculated by using in the above equation (1) the variable t representative of the point 71. If the calculated y-axis coordinate of the maximal point 71 has a decimal fraction, this y-axis coordinate value is changed to a value which is a sum of a predetermined fractional value of 0.5 and the largest integer not exceeding the original coordinate value. The predetermined value may be other decimal fractions, preferably within a range between 0.3 and 0.7.

Figure 9B:
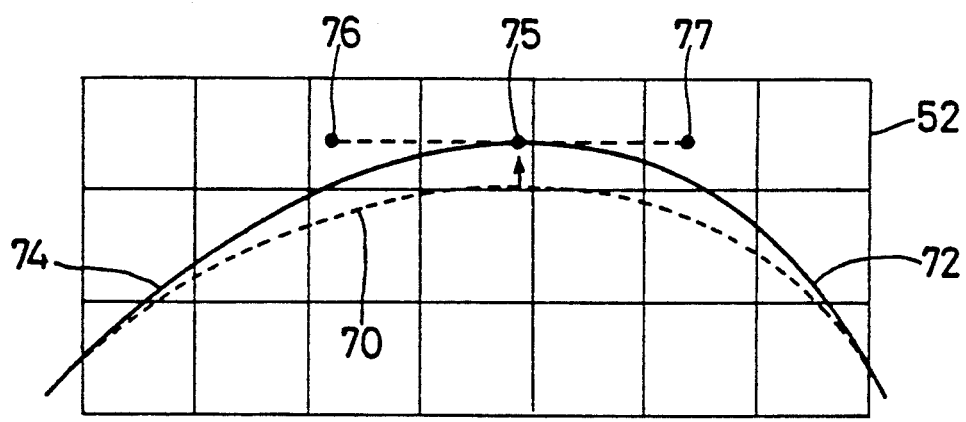

Accordingly, the y-axis coordinate of the minimal point 71 of the curved segment 70 is changed to the y-axis coordinate value as indicated at point 75 in FIG. 9B, while the coordinates of the opposite ends of the segment 70 are kept unchanged. In step S9, the y-axis coordinate value of this point 75 is stored in the memory 22, as the data 84, such that the data 84 corresponds to the data 83, namely, such that the y-axis coordinate value of the new maximal point 75 corresponds to that of the original maximal point 71.

Step S9 is followed by step S10 in which the curved segment 60 whose minimal point is moved to the point 65 is divided into two curves 62, 64, which are connected to each other at the point 65. This division of the moved curved segment 60 into the two curves 62, 64 is effected according to the above equation (7). In other words, the original curved segment 60 is replaced by the two curved segments 62, 64. Data representative of these two curves 62, 64 is obtained, as described below in detail. As a result of the movement of the original curved segment 60, that is, as a result of the replacement of the original segment 60 by the two curves 62, 64, the two image dots which are formed just above and below the original minimal point 61 according to the original outline data are not formed according to the changed outline data, in the case where the relevant image is formed to the left of the outline segment 60 (curves 62, 64). In the case where the relevant image is formed to the right of the outline segment, two image dots are newly formed just above and below the original minimal point 61 according to the changed outline data, since the corresponding two picture elements lie to the right of the newly established curved segments 62, 64.

Similarly, the curved segment 70 whose maximal point is moved to the point 75 is divided into two curves 72, 74, which are connected to each other at the new maximal point 75. This division of the moved curved segment 70 into the two curves 72, 74 is effected according to the above equation (7). In other words, the original curved segment 70 is replaced by the two curved segments 72, 74. Data representative of these two curves 72, 74 is obtained, as described below in detail. As a result of the movement of the original curved segment 70, that is, as a result of the replacement of the original segment 70 by the two curves 72, 74, the two image dots which are formed on the left and right sides of the original maximal point 71 according to the original outline data are not formed according to the changed outline data, in the case where the relevant image is formed above the outline segment 70 (curves 72, 74). In the case where the relevant image is formed below the outline segment, two image dots are newly formed on the right and left sides of the original maximal point 71 according to the changed outline data, since the corresponding two picture elements lie above the newly established curved segments 72, 74.

The manner of obtaining the data representative of the curves 62, 64, and 72, 74 in step S10 will be described. Initially, the values of the variable ti are sequentially read out from the WORKING memory 20. The number of these values ti is equal to (NX+NY). The control points and control arms of the divided curved segments 62, 64, 72, 74 are calculated according to the above equations (1) and (7), by increasing the value "i" from 0 to (j−1), where $1 \leq i \leq (NX+NY)$, $t_0 = 0$, $t_j = 1$, and $j = NX + NY + 1$.

More specifically described by reference to FIGS. 8A and 8B, the curved segment 60 of FIG. 8A whose minimal point is moved to point 65 as indicated in FIG. 8B is divided at the point 65 into the two curved segments 62, 64. Two points 66, 67 as shown in FIG. 8B and two other points (not shown) are calculated as the control points defining the two curves 62, 64. Dashed lines connecting the control points 66, 67 and the new minimal point 65 represent two control arms, which extend in the y-axis direction, since the point 65 is the minimal point in the x-axis direction. The calculated control points are stored in the memory 22. Similarly, the curved segment 70 of FIG. 9A whose maximal point is moved to point 75 as indicated in FIG. 9B is divided at the point 75 into the two curved segments 72, 74. Two points 76, 77 as shown in FIG. 9B and two other points (not shown) are calculated as the control points defining the two curves 72, 74. Dashed lines connecting the control points 76, 77 and the new maximal point 75 represent two control arms, which extend in the x-axis direction, since the point 75 is the maximal point in the y-axis direction. The calculated control points are stored in the memory 22.

Figure 10:
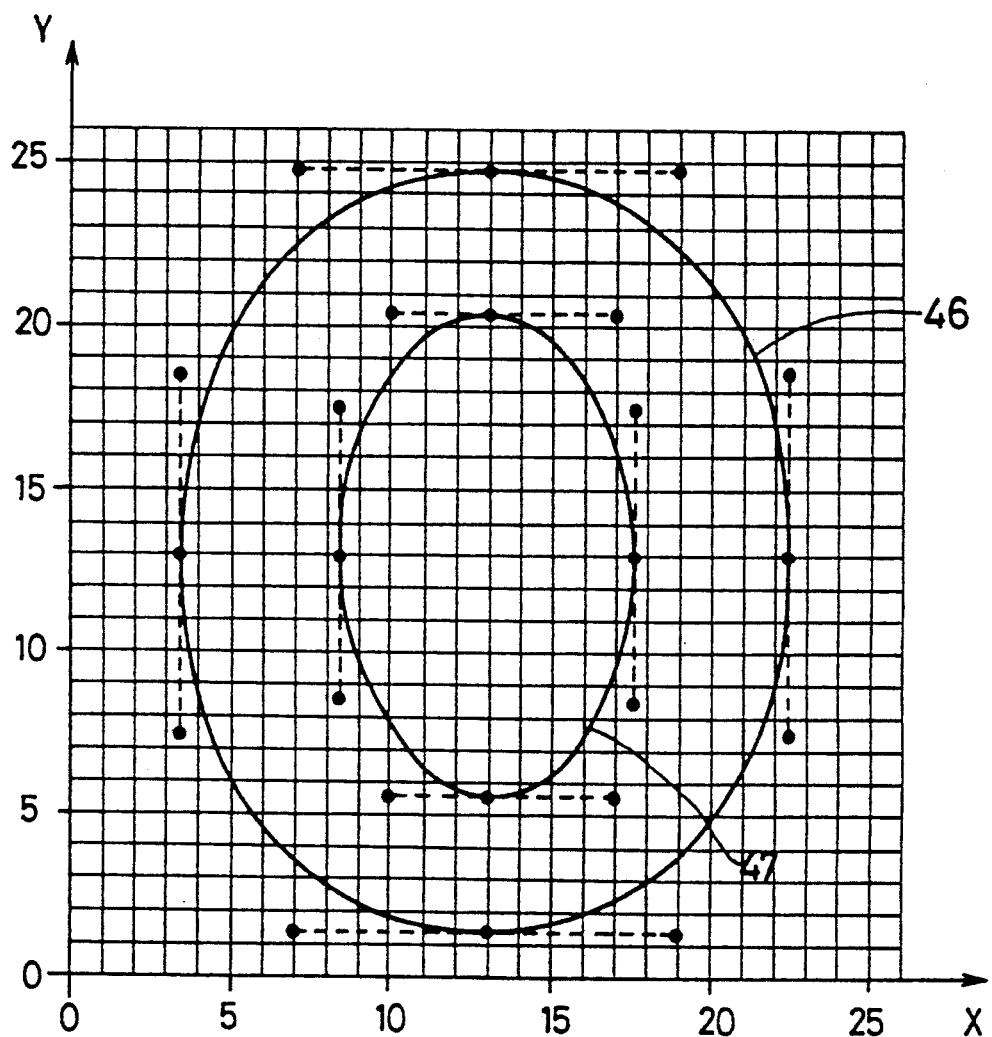
FIG. 10 is a view showing each curved segment of the outline of the letter "O", as divided into two curves.

As explained above, the original curved segment is moved by moving its maximal or minimal point in step S9, and the moved curved segment is divided into a plurality of new curved segments in step S10. In step S11, the divided curved segments are stored in the memory 22. FIG. 10 shows an example in which the outline data of the letter "O" of FIG. 4 is changed so as to move all the four curved segments. It is noted that the outline of FIG. 10 represented by the changed outline data consists of a total of eight curved segments.

Steps S12 and S13 are followed by step S13 to determine whether the point which was read in step S5 is the last point defining the character outline, or not. If a negative decision (NO) is obtained in step S13, steps S5–S14 are repeatedly executed, so that the data 81–84 for all the maximal and minimal points of the character outline are stored in the OUTLINE DATA memory 22. If the point read in step S5 is the last point of the outline, an affirmative decision (YES) is obtained in step S13, and the control flow goes to step S14 to call the outline moving routine of FIGS. 3B and 3C, in which the original outline data is changed according to the data stored in the OUTLINE DATA memory 22. Step S14 is followed by step S3 in which the curved segment data is converted into the corresponding straight segment data, which represents relatively short straight segments approximating each curved segment. Step S3 is followed by step S4 in which the outline data is converted into the dot data such that bits of the dot data are set to "1" to indicate the picture elements whose centers lie within the character outline as superimposed on the pixel screen 52. The thus obtained dot data is stored in the DOT DATA memory 24.

There will be described in detail the outline moving routine of step S14, by reference to the flow chart of FIGS. 3B and 3C. Initially, step S20 is implemented to determine whether the stored value Sx indicative of the total number of the maximal and minimal points of the character outline is equal to "0", or not. If an affirmative decision (YES) is obtained in step S20, the control flow goes to step S30 (FIG. 3C), skipping the following steps S21 through S25. In this case, the x-axis coordinates of the original character outline data are not changed. If the stored value Sx is not zero, that is, there is any maximal or minimal point whose x-axis coordinate is stored in the memory 22, a negative decision (NO) is obtained in step S20, whereby step S21 is executed to reset a counter n to zero. This counter n, which is provided by the WORKING memory 20, is adapted to count the number of the maximal and minimal points of the character outline which have been processed in steps S22 and S23 to move the character outline. Step S21 is followed by step S22 to read out from the OUTLINE DATA memory 22 the x-axis coordinate 81 of the original minimal or maximal point (61) under consideration, and the data 82 which consists of the x-axis coordinate of the moved minimal or maximal point (65) and the x-axis coordinates of the control points which define the new curved segments (62, 64). Then, the control flow goes to step S23 to find all points of the original outline data (including the straight segment data also stored in the memory 22) whose x-axis coordinates are equal to or near the x-axis coordinate of the original minimal or maximal point under consideration. For example, the original outline data is scanned to find the points having the x-axis coordinates whose difference from that of the original minimal or maximal point is less than a predetermined upper limit of 0.5. However, the upper limit of the difference may be selected within a range between 0 and 0.5. The x-axis coordinates of the points which have been found are replaced by the x-axis coordinate of the moved maximal or minimal point (65). In the example of FIGS. 8A and 8B, the x-axis coordinate of the original minimal point 61 is changed to that of the moved minimal point 65. Further, the x-axis coordinates of the control points 66, 67 of the two curved segments 62, 64 obtained by dividing the moved original curved segment 60 are changed to that of the moved minimal point 65, since the point 61 is the minimal point in the x-axis direction, and the control arms of two curved segments if obtained by dividing the original curved segment 60 at the original minimal point 61 extend in the vertical or y-axis direction. If a vertical straight segment (extending in the y-axis direction) is connected to the curved segment having the minimal or maximal point under consideration, the x-axis coordinate of this vertical straight segment may also be changed to that of the new minimal or maximal point. With the x-axis coordinates of the original outline data being changed as described above, the original curved segment 60 indicated in broken line in FIG. 8B is moved as indicated in solid line, such that the original minimal point 61 is moved to the new minimal point 65. The moved curved segment consists of the two curved segments 62, 64 which have the control points 66, 67 whose x-axis coordinate values are equal to that of the new minimal point 65.

Thus, the processing to move the original character outline in the x-axis direction in connection with one minimal or maximal point is completed, and the control flow goes to step S24 to increment the counter n, and step S25 to determine whether the content of the counter n is equal to the stored number Sx. A negative decision (NO) in step S25 indicates that the processing step S23 has not been completed for all the minimal or maximal points whose data 81 is stored in the memory 22. In this case, the control flow goes back to step S22, and steps 22-24 are repeated for the next minimal or maximal point. If an affirmative decision (YES) is obtained in step S25, this means that the processing for moving the original outline in the x-axis direction for all the minimal and maximal points is completed. In this case, the control flow goes to step S30.

Step S30 is provided to determine whether the stored value Sy indicative of the total number of the maximal and minimal points of the character outline is equal to "0", or not. If an affirmative decision (YES) is obtained in step S30, the following steps S31 through S35 are skipped, and the outline moving routine is terminated. In this case, the y-axis coordinates of the original character outline data are not changed. If the stored value Sy is not zero, that is, there is any maximal or minimal point whose y-axis coordinate is stored in the memory 22, a negative decision (NO) is obtained in step S30, whereby step S31 is executed to reset the counter n to zero. This counter n is the same as used for the x-axis coordinates. Step S31 is followed by step S32 to read out from the OUTLINE DATA memory 22 the y-axis coordinate 83 of the original minimal or maximal point (71) under consideration, and the data 84 which consists of the y-axis coordinate of the moved minimal or maximal point (75), and the y-axis coordinates of the control points which define the new curved segments (72, 74). Then, the control flow goes to step S33 to find all points of the original outline data (including the straight segment data also stored in the memory 22) whose y-axis coordinates are equal to or near the y-axis coordinate of the original minimal or maximal point under consideration. For example, the original outline data is scanned to find the points having the y-axis coordinates whose difference from that of the original minimal or maximal point is less than a predetermined upper limit of 0.5. However, the upper limit of the difference may be selected within a range between 0 and 0.5. The y-axis coordinates of the points which have been found are replaced by the y-axis coordinate of the moved maximal or minimal point (75). In the example of FIGS. 9A and 9B, the y-axis coordinate of the original minimal point 71 is changed to that of the moved minimal point 75. Further, the y-axis coordinates of the control points 76, 77 of the two curved segments 72, 74 obtained by dividing the moved original curved segment 70 are changed to that of the moved minimal point 75, since the point 71 is the minimal point in the y-axis direction, and the control arms of two curved segments obtained by dividing the original curved segment 70 at the original minimal point 71 extend in the horizontal or x-axis direction. If a horizontal straight segment (extending in the x-axis direction) is connected to the curved segment having the minimal or maximal point under consideration, the y-axis coordinate of this horizontal straight segment may also be changed to that of the new minimal or maximal point. With the y-axis coordinates of the original outline data being changed as described above, the original curved segment 70 indicated in broken line in FIG. 9B is moved as indicated in solid line, such that the original minimal point 71 is moved to the new minimal point 75. The moved curved segment consists of the two curved segments 72, 74 which have the control points 76, 77 whose y-axis coordinate values are equal to that of the new minimal point 75.

Thus, the processing to move the original character outline in the y-axis direction in connection with one minimal or maximal point is completed, and the control flow goes to step S34 to increment the counter n, and step S35 to determine whether the content of the counter n is equal to the stored number Sy. A negative decision (NO) in step S35 indicates that the processing step S33 has not been completed for all the minimal or maximal points whose data 83 is stored in the memory 22. In this case, the control flow goes back to step S32, and steps 32-34 are repeated for the next minimal or maximal point. If an affirmative decision (YES) is obtained in step S35, this means that the processing for moving the original outline in the y-axis direction for all the minimal and maximal points is completed. In this case, the present outline moving routine is terminated.

Figure 3A:
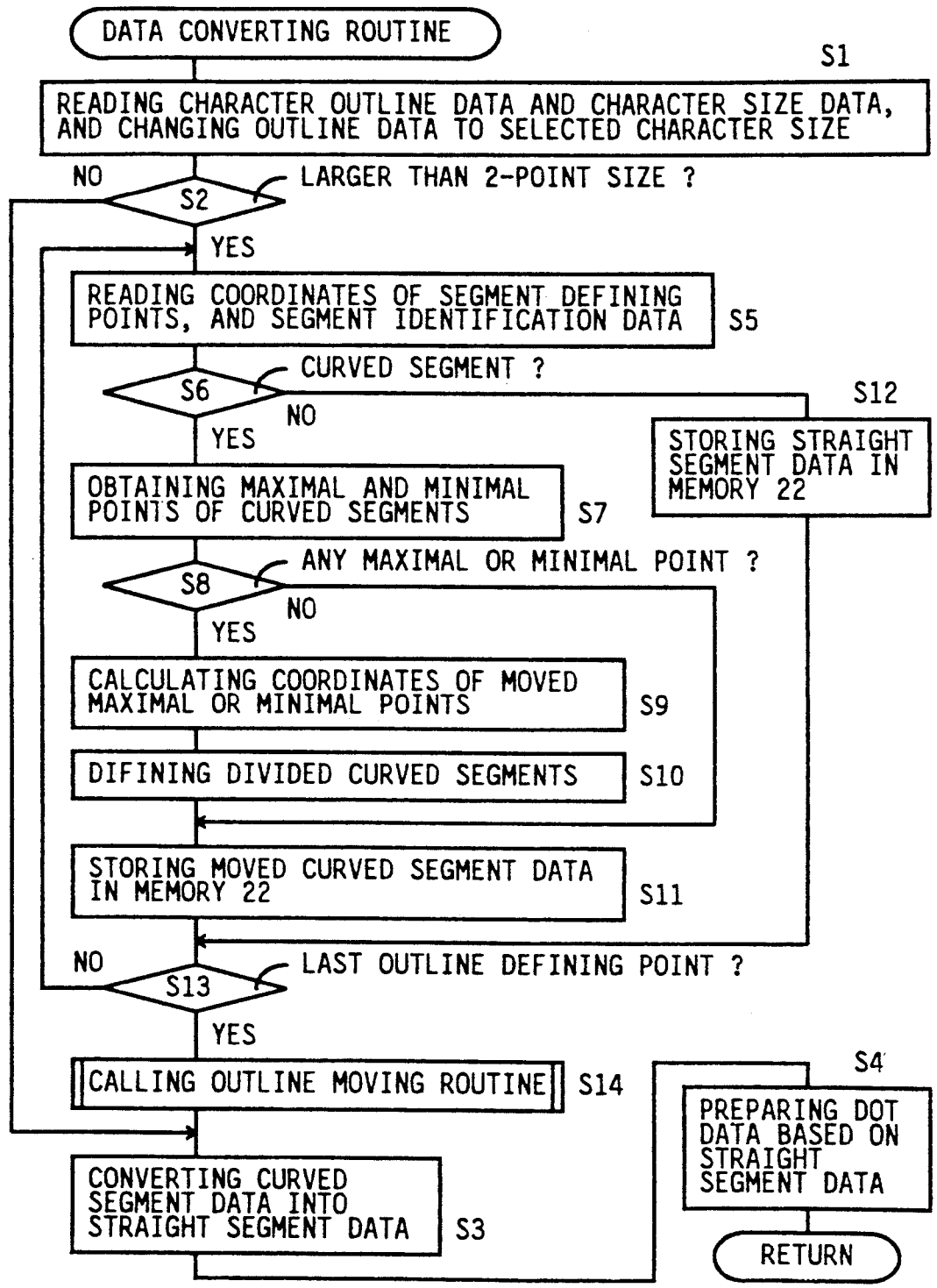
Figure 3C:
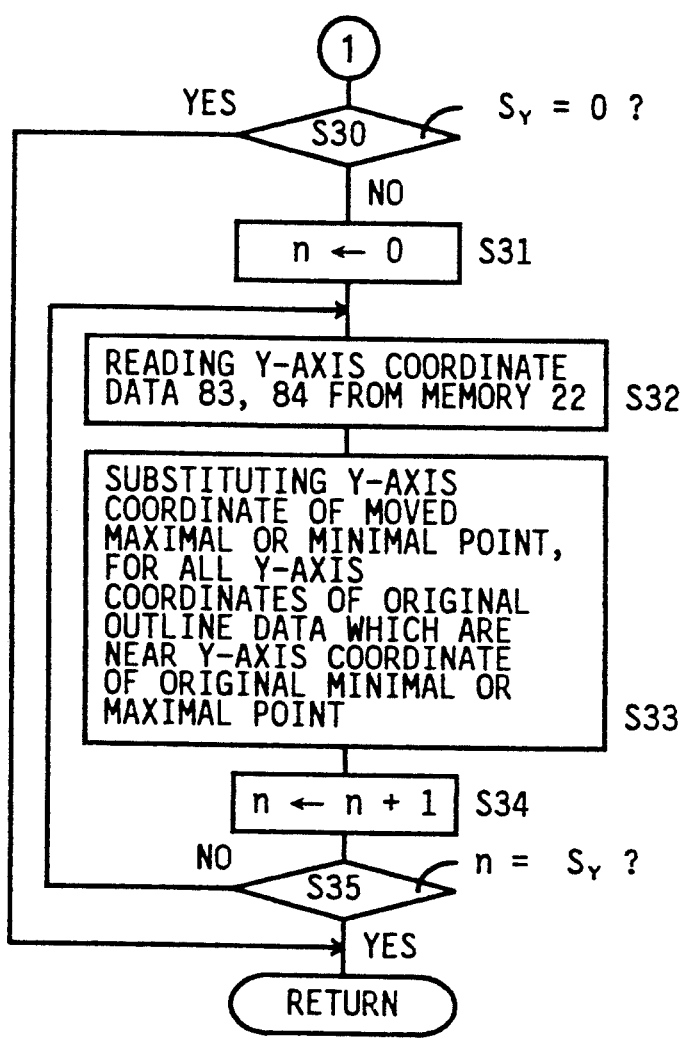
Figure 11:
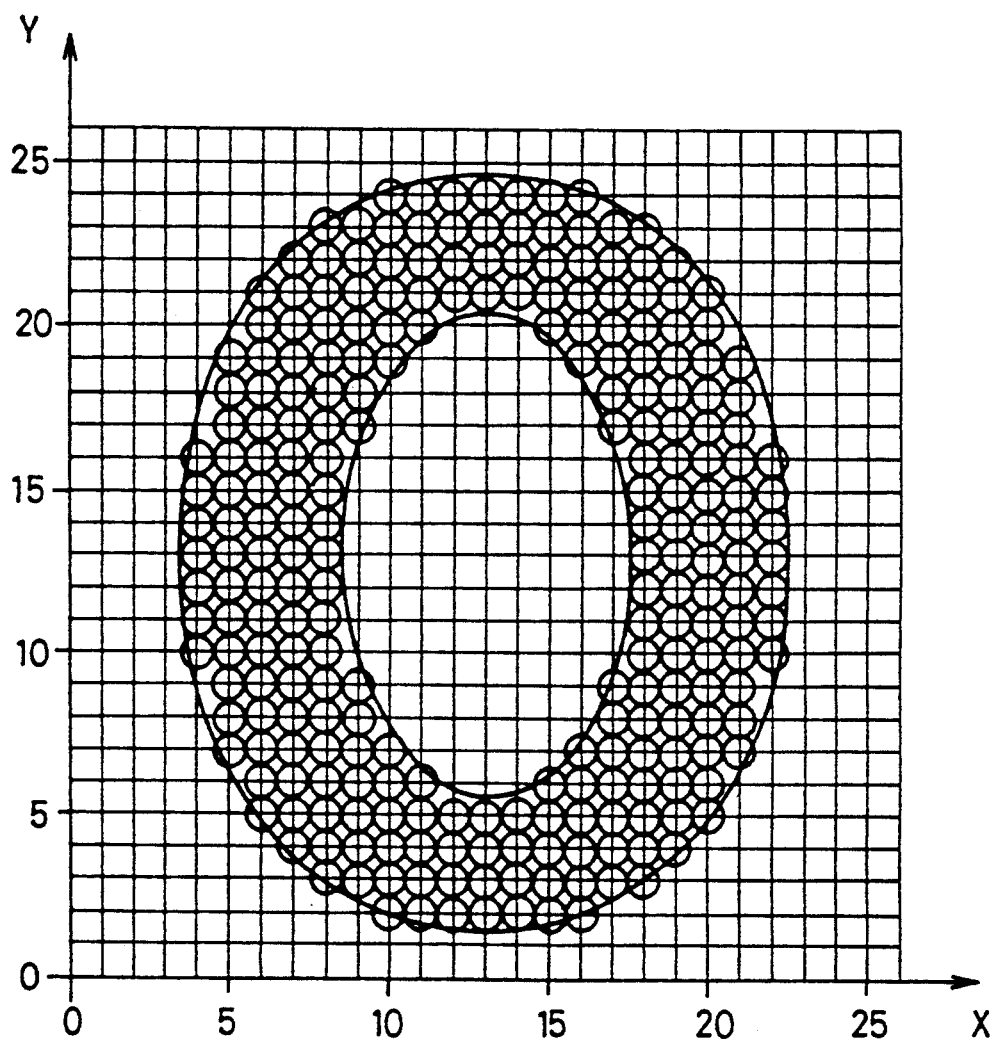
FIG. 11 is a view showing the dot arrangement of the letter "O" as superimposed on the pixel screen, according to the outline data changed according to the principle of the invention.

With the outline moving routine of FIGS. 3B and 3C executed with respect to the outline (46, 47) of the letter "O" as shown in FIG. 6, the outline is moved as shown in FIG. 10. If the bits of the dot data prepared according to the outline data representative of the moved outline are set to "1" for the picture elements whose centers are located between the outer and inner loops 46, 47 of the outline, image dots are formed as shown in FIG. 11. The image dots have a circular shape. It will be understood that the letter "O" of FIG. 11 has smoother outer and inner profiles, with a higher degree of continuity of the image dots, than the letter "O" of FIG. 6.

In the present laser printer having the data converting apparatus, the outline data representative of the outlines of characters is changed so as to smooth the curved portions of the outlines the characters as printed according to the dot data prepared by conversion from the changed outline data. Further, the present printer does not require a large-capacity memory for storing a large volume of dot data representative of x-axis and y-axis coordinates of dot positions of all characters in different sizes, since the dot data for the desired characters of a selected size is prepared from time to time by conversion from the outline data of the characters. Since the volume of the outline data is considerably smaller than that of the dot data, the required storage capacity of the memory for the outline data is accordingly reduced.

It will be understood that the dot data preparing portion 40 of the CPU 12 executes steps S3 and S4 and functions to convert the outline data into the corresponding dot data, and the portion of the CPU 12 assigned to execute steps S9 functions to calculate the coordinates of the minimal and maximal points of the curved segments of the original character outline, and calculate the coordinates to which the original minimal and maximal points are moved. Further, the outline data changing portion 38 of the CPU 12 executes the outline moving routine of FIGS. 3B and 3C and functions to change the outline data so as to move the original character outline.

While the illustrated embodiment described above is adapted to execute steps S5 through S14 of FIG. 3A for the entire portion of the character outline, it is possible that these steps are applied to each one of divided portions of the character outline, independently of the other divided portions. For instance, the determination in steps S23 and S33 to find the x-axis or y-axis coordinates of the outline data which are near the coordinates of the original minimal and maximal points is limited to each one of the divided portions, and does not affect the other divided portions. In this respect, it is noted that some characters such as "i", "j" and "=" have separate outline portions or strokes. Further, the steps may be applied to only a specified portion of a character. It is also possible to use different outline data changing routines for different portions of the character outline.

In the example of the letter "O" shown in FIG. 4, the single stroke 44 is defined by the outer and inner loops 46, 47, and the outline data includes data indicating whether each outline segment (four curved segments) belongs to the outer loop 46 or inner loop 47. However, the outer and inner loops 46, 47 may be discriminated from each other based on the direction in which the points defining the loops are scanned.

It is desirable that the outline data includes data indicative of the nominal width or widths of each stroke in one or both of the x-axis and y-axis directions, so that the width of the stroke as printed according to the obtained dot data is equal to the nominal width. In this case, the movement of the character outline according to the present invention is desirably effected with the nominal width taken into consideration. In the example of the letter "O", the outline data is changed for moving the original outline, so as to assure the nominal widths of the stroke 44 as measured in the x-axis and y-axis directions, as well as assure smooth continuous inner and outer profiles of the letter "O" as printed.

While the present invention has been described in its presently preferred embodiment as applied to a laser printer, the principle of the invention is applicable to a device other than a printer, such as a display device, which device requires conversion of outline data of characters such as letters, symbols and other visible representations into corresponding dot data.

It is to be understood that the present invention may be embodied with various other changes, modifications and improvements, which may occur to those skilled in the art, in the light of the foregoing teachings.

What is claimed is:

1. A data converting apparatus having dot data preparing means for converting a batch of original outline data representative of an outline of a character into a batch of dot data indicative of the presence of image dots to be formed at positions of picture elements whose centers are located within the outline of the character when said outline of the character is superimposed on a coordinated pixel screen, wherein the picture elements are defined by a plurality of parallel x-axis pixel lines and a plurality of parallel y-axis pixel lines perpendicular to said x-axis pixel lines, said outline comprising at least one segment including at least one curve, wherein the improvement comprises:

calculating means for calculating a coordinate value of a maximal or minimal point of said at least one curve of said outline of said character as measured in an x-axis direction parallel to said x-axis pixel lines or a y-axis direction parallel to said y-axis pixel lines; and outline moving means responsive to said calculating means, for moving each of said at least one curve of said outline such that the coordinate value of said maximal or minimal point of said each curve moved by said outline moving means has a decimal fraction between 0.3 and 0.7 of a size of said picture elements, which size is defined by a spacing of said x-axis and y-axis pixel lines, wherein said pixel lines define coordinate values represented by integers;

wherein said dot data preparing means prepares said dot data according to the outline data representative of the outline moved by said outline moving means.

2. A data converting apparatus according to claim 1, wherein said decimal fraction is 0.5.

3. A data converting apparatus according to claim 1, wherein said at least one curve of said outline of the character includes a Bezier curve, and said calculating means calculates the coordinate value of a maximal or minimal point of said Bezier curve, said outline moving means moving said outline such that the maximal or minimal point of said Bezier curve is moved, said outline moving means including means for dividing said Bezier curve into two curves such that said two curves are connected to each other at the maximal or minimal point which has been moved.

4. A data converting apparatus according to claim 3, wherein said outline moving means changes the coordinate value of said maximal or minimal point of said Bezier curve while maintaining coordinate values of opposite ends of said Bezier curve as represented by said original outline.

5. A data converting apparatus according to claim 1, wherein said outline moving means includes means for finding all points which define said at least one curve and which have a coordinate value whose difference from the coordinate value of said maximal or minimal point calculated by said calculating means falls within a predetermined range, said outline moving means moving said found points in the x-direction or the y-direction so that said coordinate value of said found point is the same as the x-direction or y-direction values to which said maximal or minimal point is moved.

6. A data converting apparatus according to claim 5, wherein said predetermined range of said difference is between 0 and one half said size of said picture elements.

7. A data converting apparatus according to claim 1, further comprising:
contracting means for contracting said original outline to a selected character size; and
means for inhibiting an operation of said outline moving means when said selected character size is not larger than a predetermined limit.

8. A data converting apparatus according to claim 1, wherein said outline moving means includes memory means for storing original coordinate values of said original outline data, and changed coordinate values to which the outline represented by said original outline are moved, such that said changed coordinate values correspond to said original coordinate values.

9. A data converting apparatus for converting original data representing a character outline into dot data representing image dots having centers formed at pixel positions within the character outline, the pixel positions being defined on a pixel grid having X-axis pixel lines and Y-axis pixel lines, the X-axis pixel lines and Y-axis pixel lines being spaced apart by the width of a pixel and defining integer X and Y coordinate values on the pixel grid, the character outline comprising a plurality of segments including curved segments, the apparatus comprising:
a segment identifier that identifies at least one of said curved segments;
a calculator, responsive to the segment identifier, that calculates an original coordinate value of a maximal or minimal point of the curved segment; and
an outline mover, responsive to the segment identifier, that moves the maximal or minimal point to a new position on the pixel grid, the new position being offset from each X-axis pixel line or each Y-axis pixel line in the pixel grid,
wherein said new position of said maximal or minimal point is defined by a new coordinate value, and wherein each original coordinate value and each new coordinate value comprises an integer portion and a decimal portion, said each new coordinate value being determined by adding a predetermined value to the integer portion of the corresponding original coordinate value.

10. The apparatus of claim 9, wherein the amount of offset between the new position and the nearest pixel line is between three tenths and seven tenths the width of a pixel.

11. The apparatus of claim 9, wherein the predetermined value is between 0.3 and 0.7.

12. The apparatus of claim 9, wherein the predetermined value is 0.5.

13. The apparatus of claim 9, wherein
the outline mover finds all points on said at least one curved segment that have an a coordinate value within a predetermined range of the original coordinate value and changes the coordinate value of each such found point to the coordinate value of the new position.

14. The apparatus of claim 13, wherein the predetermined range has a maximum value of one half the width of a pixel.

15. A method of improving the appearance of a character upon converting original character outline data into dot data representing image dots having centers formed at pixel positions within the character outline, the pixel positions being defined on a pixel grid having X-axis pixel lines and Y-axis pixel lines, the X-axis pixel lines and Y-axis pixel lines being spaced apart by the width of a pixel and defining coordinate values on the pixel grid, the method comprising the steps of:
reading the original character outline data to determine points that define segments of the outline;
determining segments of the outline that are curved;
determining a minimal or maximal point of at least one of the curved segments;
calculating an original coordinate value of the minimal or maximal point of said at least one curved segment, the original coordinate value having an integer portion and a decimal portion;
determining a new coordinate value for the minimal or maximal point, the determining step including the step of adding a predetermined value to the integer portion of the original coordinate value to obtain the new coordinate value of the minimal or maximal point;
moving the minimal or maximal point to a new position defined by the new coordinate value;
finding all points on said at least one curved segment that have original coordinate values whose difference from the original coordinate value of the minimal or maximal point is within a predetermined range; and
moving said found points so that said coordinate values of said found points are the same as the new coordinate value of the minimal or maximal point.

16. The method of claim 15, wherein the predetermined value is between 0.3 and 0.7.

17. The method of claim 15, wherein the predetermined value is 0.5.

* * * * *